United States Patent
Alacqua et al.

(10) Patent No.: US 6,835,083 B1
(45) Date of Patent: Dec. 28, 2004

(54) ACTUATOR DEVICE WITH SHAPE-MEMORY FLEXIBLE CABLE

(75) Inventors: Stefano Alacqua, Cascine Vica (IT); Francesco Butera, Turin (IT)

(73) Assignee: C.R.F. Societa Consortile per Azioni, Turin (IT)

(*) Notice: Subject to any disclaimer, the term of this patent is extended or adjusted under 35 U.S.C. 154(b) by 0 days.

(21) Appl. No.: 10/636,783

(22) Filed: Aug. 8, 2003

(30) Foreign Application Priority Data

Jan. 28, 2003 (IT) ........................ TO2003A045

(51) Int. Cl.⁷ .............................................. H01R 13/62
(52) U.S. Cl. ........................................ 439/310; 310/307
(58) Field of Search ................... 439/310, 86; 310/307

(56) References Cited

U.S. PATENT DOCUMENTS

| | | | |
|---|---|---|---|
| 5,831,820 A | * 11/1998 | Huang | 361/686 |
| 5,931,422 A | * 8/1999 | Geiger et al. | 244/214 |
| 6,384,707 B2 | * 5/2002 | Minners | 337/139 |
| 6,509,094 B1 | * 1/2003 | Shah et al. | 428/395 |

FOREIGN PATENT DOCUMENTS

| | | |
|---|---|---|
| DE | 199 16 244 C1 | 9/2000 |
| EP | 0 778 590 A2 | 6/1997 |
| EP | 1 245 762 A1 | 10/2002 |

* cited by examiner

*Primary Examiner*—Tho D. Ta
*Assistant Examiner*—X. Chung-Trans
(74) *Attorney, Agent, or Firm*—Sughrue Mion, PLLC

(57) ABSTRACT

An actuator including a shape-memory flexible cable with a flexible sheath can be used, by controlling it both electrically and mechanically using the sheath as element for applying a mechanical tensile force. The shape-memory flexible cable is provided with a coating made of synthetic or elastomer material moulded thereon and adherent thereto, which favors rapid return of the shape-memory cable into its resting configuration after its activation both on account of its elastic return and owing to the fact that it favors cooling of the cable. Preferably, the coating is obtained by means of a process of co-extrusion with the shape-memory cable.

2 Claims, 1 Drawing Sheet

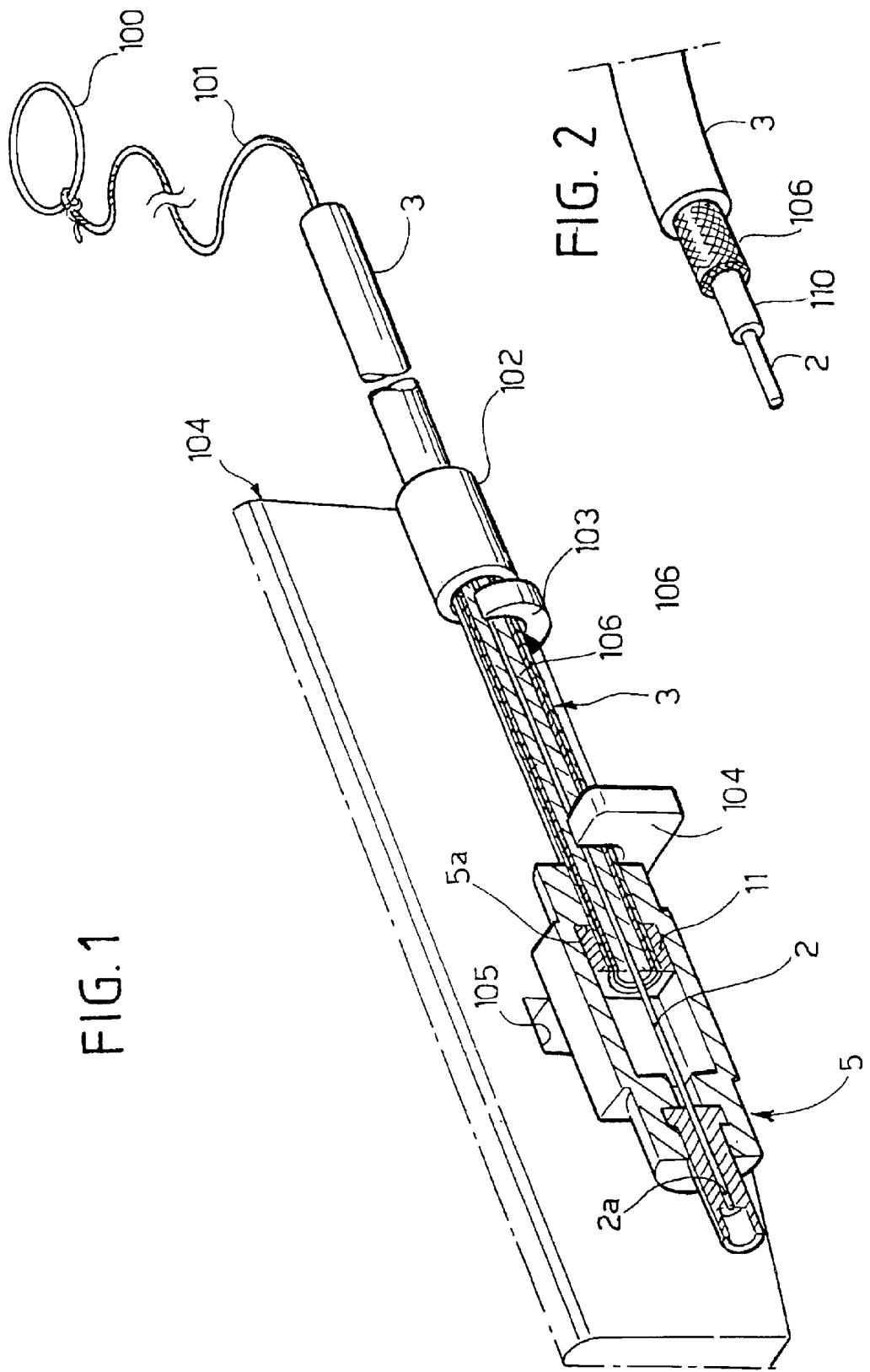

ACTUATOR DEVICE WITH SHAPE-MEMORY FLEXIBLE CABLE

BACKGROUND OF THE INVENTION

The present invention relates to an actuator device comprising a flexible cable, which has one end connected to a controlled member, and a flexible sheath, inside which is mounted the flexible cable, in which at least one portion of the flexible cable consists of a shape-memory material, which is able to undergo a variation of shape following upon its heating, in order to control the controlled member.

Flexible-cable actuator devices find their application in a wide range of fields and in general wherever it is necessary to provide a mechanical transmission which is simple and inexpensive and will enable remote control of the displacement of a member. Flexible-cable actuator devices are, for example, used for providing manual-control actuations on motor vehicles, for example for release from inside of the rear hatchback or of the bonnet, or for actuation of mobile parts or of mechanisms of seats of motor vehicle, or for the actuation of mobile members of the engine or of facilities on board the motor vehicle. There is moreover known a wide range of applications also outside the automobile field.

A flexible-cable actuator device having the characteristics referred to at the start of the present description is known from the document DE-C-199 16 244. Said known device is designed to be controlled manually in all conditions of use. However, its actuation brings about an activation of the shape-memory element, with the consequence that the controlled member undergoes an additional displacement with respect to the one brought about by mere manual actuation.

In the prior Italian patent application No. TO2001A000618, filed on Jun. 27, 2001, and in the corresponding international patent application PCT/IB02/02361, the present applicant has proposed an actuator device comprising:

a flexible cable having one end connected to a controlled member, and a flexible sheath inside which is mounted the flexible cable, in which at least one portion of the flexible cable consists of a shape-memory material which is able to undergo a variation of shape following upon its heating in order to control the controlled member, in which the aforesaid sheath is mounted with respect to a fixed supporting structure so as to be free to be displaced longitudinally only in a direction corresponding to the direction of actuation of the controlled member, and in which, moreover, the aforesaid sheath is coupled to the controlled member so as to be able to transmit directly thereto a displacement in the aforesaid direction of actuation and to be, instead, uncoupled by the controlled member in the event of a movement in the opposite direction, in such a way that said actuator is able to be used both manually, as element of mechanical transmission, using the sheath as element of transmission, and exploiting the variation of shape of the shape-memory cable, which can be obtained with its heating. The heating can be obtained by causing passage of electric current through the shape-memory cable.

SUMMARY OF THE INVENTION

With the purpose of further improving the actuator device described above, the subject of the present invention is a device having all the characteristics referred to above and characterized in that said flexible cable is provided with a coating of elastomer or synthetic material moulded thereon and adherent thereto, which is elastically deformed when the shape-memory cable is activated, so as to favour return of the shape-memory cable to its resting position both thanks to its elastic return, and in so far as it accelerates cooling of the shape-memory cable after activation.

Preferably said coating is obtained by means of an operation of simultaneous extrusion (co-extrusion) together with the shape-memory cable.

It should be noted that the coating thus obtained adheres to the cable and constitutes a separate element both with respect to the sheath of the actuator device and with respect to possible further spacer coatings, which are also illustrated in the preceding patent application of the present applicant, set between the cable and the sheath.

The material of the coating co-extruded on the cable is chosen so as to enable a dual advantage to be obtained. On the one hand, said material is not an electrical conductor, so that it will not heat up, as, instead, the cable does heat up when the latter is traversed by electric current during activation of the actuator. Consequently, the material of the aforesaid co-extruded coating favours and accelerates the cooling of the shape-memory cable at the end of the activation step. A second important advantage lies in the fact that since the aforesaid coating is made of elastic material it acts as a distributed spring that undergoes a compressive stress when the cable made of shape-memory material is shortened following upon its activation. Consequently, the coating contributes to a rapid return of the cable into the resting condition, at the end of an activation step, not only in so far as it accelerates cooling, but also in so far as it pushes the cable towards its resting condition as a result of its elastic return.

Of course, the invention is of general application and can consequently be used also outside the automobile sector, and in particular in any sector where it may prove useful to apply an actuator device that can be actuated both manually and electrically. Shape-memory actuator elements have been known for some time and used in a wide range of fields in which it is necessary to have available actuator means of simple and low-cost structure. They use shape-memory metal alloys capable of being deformed following upon overstepping of a pre-determined transition temperature. In general, heating can be obtained by the actuator element detecting directly a variable temperature, or else by supply of an electric current through the actuator element so as to heat it by the Joule effect. In the case of the invention, the electrical-supply means can be associated to electronic-control means designed for controlling supply of electric current according to a signal detected by a temperature sensor, by a position or displacement sensor or by a potentiometer.

Of course, the configuration of the cable made of shape-memory material can be any whatsoever. In particular, the cable can also have a U-shaped configuration, with a forward stretch and a return stretch, and its two ends set adjacent to one another, or else again it is possible to provide a plurality of cables co-extruded inside one and the same coating material.

BRIEF DESCRIPTION OF THE DRAWING

The invention will now be described with reference to the annexed drawings, which are provided purely by way of non-limiting example and in which:

FIG. 1 is a partially sectioned perspective view of an embodiment of the actuator device previously proposed by the present applicant, corresponding to FIG. 5 of the international patent application PCT/IB02/02361 mentioned above; and FIG. 2 is a partial and partially sectioned perspective view of the cable forming part of the actuator device according to the present invention.

DETAILED DESCRIPTION OF THE INVENTION

With reference to FIG. 1, there is here illustrated an example of application of the actuator previously proposed for control of the lock of a rear hatchback of a motor vehicle.

There exist standards that impose on the manufacturer the need to provide for the possibility of manual operation of the lock from inside in order to enable the opening of the hatchback for a person who were to remain accidentally closed inside the motor vehicle. In the example illustrated, the actuator can be operated manually by means of a ring 100 that is connected via a cable 101 to the sheath 3 of a flexible-cable actuator device. Secured on the sheath 3 is a bushing 102, which is designed to come to bear upon a fixed arrest 103 forming part of the structure 104 of the device of the hatchback lock. The cooperating action of the bushing 102 fixed to the sheath 3 and of the arrest 103 prevents a displacement of the sheath 3 in a direction opposite to the direction of actuation. Inside the sheath 3 is set a flexible cable 2 made of shape-memory material, which is secured, at one end 2a, to a cylindrical body 5, which is in turn connected, through a slit 105 made in the wall of the shell of the lock 104, to the controlled member of the lock (not illustrated). Also provided are means of electrical supply (not illustrated) for applying a voltage to the two opposite ends of the shape-memory cable 2 in order to bring about its shortening. When the actuator is operated manually by acting on the ring 100, the mechanical tension is transmitted through the sheath 3, which is displaced to the right (as viewed in FIG. 1), causing a recession of the bushing 102 away from the fixed arrest 103. The displacement of the sheath 3 causes a corresponding displacement of the cylindrical body 5 since anchored to the end of the sheath 3 is a ring 11 that bears upon an end surface 5a of an internal cavity of the cylindrical body 5. The displacement of the latter causes an actuation of the controlled member, which, as already mentioned, is connected to the cylindrical body 5 by means of a connection passing through the slit 105.

In the case, instead, of electrical actuation, the sheath 3 remains stationary, since it is not able to displace to the left as a result of the engagement of the bushing 102 against the fixed arrest 103, whilst the shape-memory cable 2 is shortened, causing a sliding of the cylinder 5 over the sheath 3 (so that the ring 11 is moved away from the contrast surface 5a) and again an actuation of the controlled member.

The advantage of using the sheath of the actuator device as element of mechanical transmission in the case of manual actuation lies in the fact that, in this way, it is always possible to guarantee operation of the device also in the case of an accidental failure of the shape-memory flexible cable.

It may be noted that in the case of the solution previously proposed, which is illustrated in FIG. 1, set between the cable 2 and the sheath 3 is a spacer layer 106 made of synthetic material, which is joined to the sheath 3 and is fixed thereto. Said layer fulfils only a function of spacer so that, during operation of the device, there is created a relative movement of the flexible cable with respect thereto.

In the case of the invention, instead, there is proposed an actuator device that is substantially similar to the one illustrated in FIG. 1, with the difference, however, that the flexible cable has a structure of the type illustrated in FIG. 2. In this FIG., the parts corresponding to the ones of FIG. 1 are designated by the same reference numbers. As may be seen, also according to the present invention there is provided the flexible cable 2 made of shape-memory material, with the corresponding flexible sheath 3, and a spacer layer 106, which in the case illustrated consists of a metallic sheathing or hose.

The difference with respect to the solution previously proposed and illustrated in FIG. 1 lies in the fact that in this case, above the cable made of shape-memory material 2 is moulded a coating layer 110, which adheres to the shape-memory cable 2 and is chosen between an elastomer/silicone or synthetic material such as to favour both cooling of the cable 2 after cessation of the passage of electric current and the return of the cable 2 to its resting configuration as a result of the elastic return of the coating 110.

As already mentioned, preferably the coating 110 is moulded over the cable 2 by means of an operation of co-extrusion of the material constituting the cable 2 and of the coating 110. In other words, during the production process, the cable 2 and the corresponding coating 110 are obtained simultaneously by means of a process of co-extrusion, which has the advantage of enabling the desired structure to be obtained with a single operation, without any need for additional assembly operations.

As already mentioned, the coating 110, which is adherent to the cable 2, performs the function of a spring distributed longitudinally, which is subject to a compression when the cable 2 is shortened following upon the its activation and consequently favours return of the cable to the resting position as a result of its elastic return.

As already mentioned above, the configuration of the shape-memory cable can be any whatsoever. It is moreover possible to co-extrude a number of shape-memory cables inside the same coating. Of particular interest is a U-shaped configuration of the cable, with a forward stretch and a return stretch and the two ends of the cable that are adjacent to one another, which, among other things, enables the advantage of a convenient electrical connection of the cable to the electrical-supply means.

Of course, without prejudice to the principle of the invention, the details of construction and the embodiments may vary widely with respect to what is described and illustrated purely by way of example, without thereby departing from the scope of the present invention.

What is claimed is:

1. An actuator device, comprising:

a cable, having one end connected to a controlled member, and a sheath, inside which there is mounted the cable, in which at least one portion of the cable consists of a shape-memory material, which is able to undergo a variation of shape following upon heating, in order to control the controlled member, in which said sheath is mounted with respect to a fixed supporting structure so as to be free to be displaced longitudinally only in the direction of actuation of the controlled member, and in which moreover the aforesaid sheath is coupled to the controlled member so as to be able to transmit directly thereto a displacement in the aforesaid direction of actuation and to be, instead, uncoupled from the controlled member in the event of a movement in the direction opposite to the direction of actuation, in such a way that said actuator is able to be used both via manual actuation, using the sheath as element of mechanical transmission, and exploiting the variation of shape of the shape-memory cable, which can be obtained via its heating, wherein said cable is provided with a coating of elastomer/silicone or synthetic material moulded thereon and adherent thereto, which is elastically deformed when the shape-memory cable is activated, so as to favour return of the shape-memory cable to its resting position both on account of its elastic return and in so far as it accelerates cooling of the shape-memory cable after an activation.

2. The actuator device according to claim 1, wherein said coating is obtained by means of a process of co-extrusion with the shape-memory cable.

* * * * *